(No Model.)
W. J. VALENTINE.
PEDAL CRANK FOR BICYCLES, &c.
No. 573,055.    Patented Dec. 15, 1896.
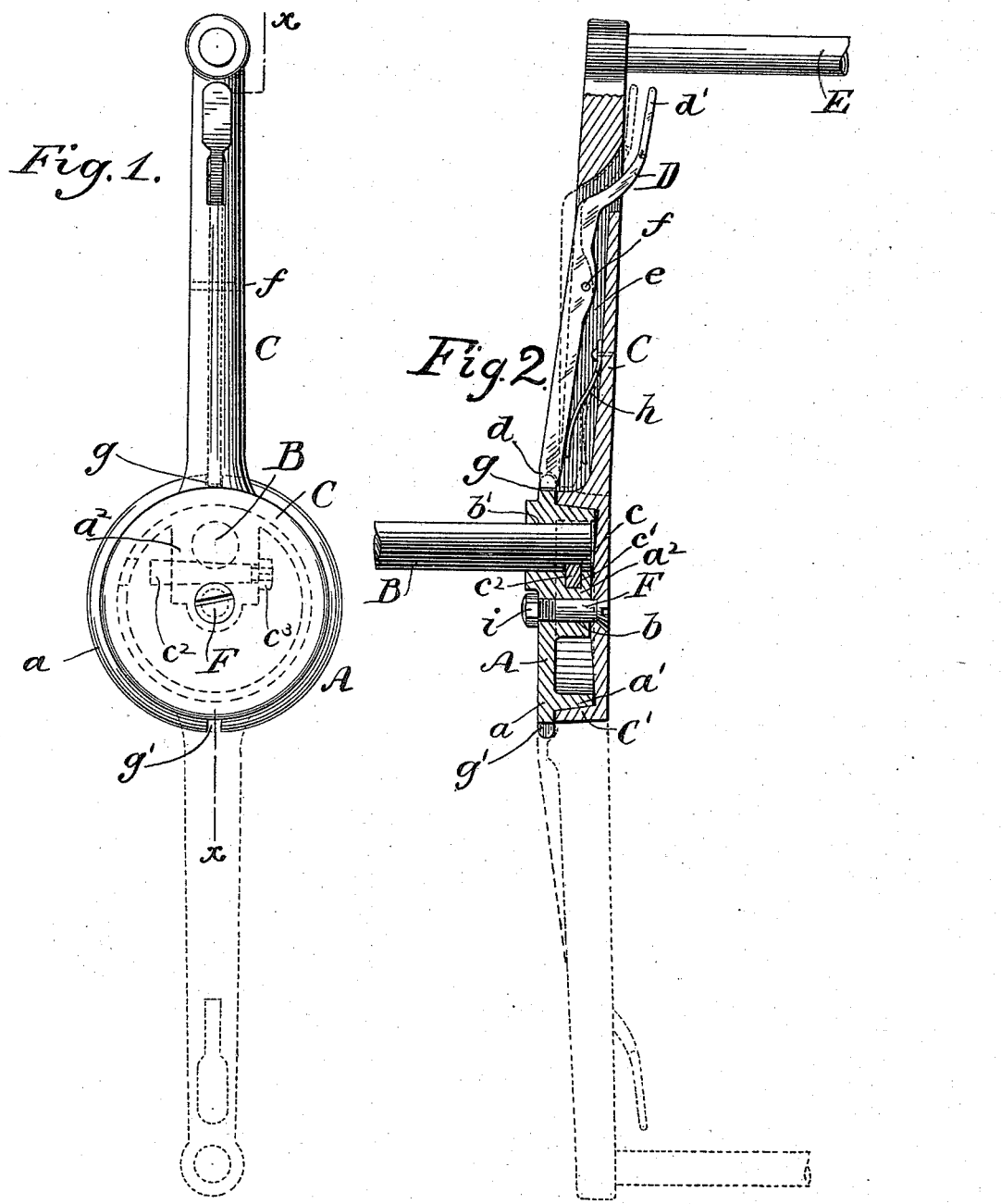

UNITED STATES PATENT OFFICE.

WILLIAM J. VALENTINE, OF WARRENSBURG, NEW YORK.

PEDAL-CRANK FOR BICYCLES, &c.

SPECIFICATION forming part of Letters Patent No. 573,055, dated December 15, 1896.

Application filed July 26, 1895. Serial No. 557,197. (No model.)

*To all whom it may concern:*

Be it known that I, WILLIAM J. VALENTINE, a citizen of the United States, and a resident of Warrensburg, county of Warren, and State of New York, have invented certain new and useful Improvements in Pedal-Cranks for Bicycles or other Vehicles, of which the following is a specification, reference being had to the accompanying drawings, forming a part thereof, in which similar letters of reference indicate corresponding parts.

This invention relates to improvements in pedal-cranks for bicycles or other vehicles, and has for its object to provide an article of this character which will allow a rider to arbitrarily shorten or lengthen the distance between the pedals and the driving-shaft of the vehicle by the simple action of pressing a lever with the side of the foot without in any way retarding the movement of the vehicle.

The invention will be hereinafter fully described and specifically set forth in the annexed claims.

In the accompanying drawings, forming part of this application, Figure 1 is a side elevation of my improved bicycle-crank having the pedals detached therefrom, and Fig. 2 is a vertical sectional elevation taken on the line $x\ x$ of Fig. 1.

In the practice of my invention I provide a hub A, which comprises a circular disk $a$, an annular flange $a'$, and a lug $a^2$, all formed integrally with each other.

Through the center of the hub A, I provide an aperture $b$, and eccentrically thereto I provide a further aperture $b'$, which latter aperture is adapted to receive the end of any suitable driving-shaft B, which said shaft may be provided with a groove $c$, which is adapted to register with an aperture $c'$, formed through the lug $a^2$ of the hub A, and the shaft B is securely attached to the hub A by means of a wedge-shaped key $c^2$, which is held in place by a nut $c^3$. The crank C is provided at its inner end with a circular box C', which fits snugly over the annular flange $a'$ of the hub A. To secure the crank C to the hub A, I provide within a recess $d$ of the crank C a pivoted lever D, which is securely held by a pin $f$.

The lower end $d$ of the lever D is normally pressed into engagement with notches $g$ and $g'$ (formed in the outer edge of the disk $a$ of the hub A) by any suitable spring $h$. The crank C is further provided on its outer end with a suitable spindle E, to which an ordinary pedal may be attached.

In order to securely attach the crank C to the hub A in such a manner as to prevent lateral motion of the crank upon the flange $a$ of the hub A, a spindle F is passed through the aperture $b$ of the hub A and is secured by means of a nut $i$. The said spindle is provided with an enlarged head upon its outer end, and the crank C is permitted to revolve around it.

In the operation of my invention the crank is normally set in position, as illustrated by full lines in the drawings, and the lever D is in engagement with the notch $g$, thus forming a secure attachment between the hub A and the crank C, and any suitable bicycle or other vehicle to which the device may be attached can be driven or propelled in the ordinary way, and the short crank will be used upon all level roads. In ascending a hill, however, it is advisable to have more leverage and a longer crank, which will give the operator more power.

When it is desired to lengthen the crank, the operator will simply press the end $d'$ of the lever D until it assumes the position as shown by dotted lines in Fig. 2. This will release the crank C from its hub A, and said hub will revolve within the crank, which is held from turning until the position illustrated by dotted lines of the drawings is reached, when the spring $h$ will press the lever D into engagement with the slot $g'$ of the hub A, and this lengthened condition of the crank may be maintained until the operator desires to shorten it, when by a pressure of the foot upon the lever D the crank will return to its normal position in a manner precisely like that described above and the operation may be continued at the will of the operator. The position most favorable for the operation of changing the length of crank is when the pedal is down.

I do not confine myself to the exact construction and means for assembling the parts as above described, as under the scope of my invention slight variations in mechanical detail may be permissible. For instance, the hub A may be attached to the shaft B in any suitable and convenient manner common to such constructions.

Having thus described my invention, what I claim as new, and desire to secure by Letters Patent, is—

1. In a pedal-crank for bicycles or other vehicles, the combination of the hub having an eccentrically-arranged driving-shaft secured thereto, which hub comprises a disk having two notches in the periphery thereof located diametrically opposite to each other and upon an imaginary line which exactly bisects the face of the hub and the end of its attached shaft; and an annular flange upon the face thereof, and a crank comprising a circular box, a radial arm and a spring-pressed lever led along the arm of said crank to a point opposite the pedal, and operated from the same, said box being fitted snugly over the said annular flange and pivotally attached to the said hub at the center thereof, and said lever being in normal engagement with one of the notches of the circular disk and being adapted to bear upon the face of said disk during the operation of adjusting the crank; substantially as shown and described.

2. In a pedal-crank for bicycles or other vehicles, the combination of the hub having an eccentrically-arranged driving-shaft secured thereto, which hub comprises a disk having two notches in the periphery thereof located diametrically opposite to each other upon an imaginary line which would exactly bisect the face of the hub and its attached shaft, and an annular flange upon the face thereof; with the crank which comprises a circular box and a radially-projected arm having a spring-pressed lever pivotally secured in a recess thereof, and extending along the arm of crank and operated by the foot without withdrawal from the pedal, said box being snugly fitted over the flange of the hub and pivotally attached to said hub by means of a spindle and said lever adapted to bear upon the face of the hub during the process of adjustment and to engage with the notches thereof when the device is being operated; substantially as shown and described.

In testimony that I claim the foregoing as my invention I have signed my name, in presence of two witnesses, this 23d day of July, 1895.

WILLIAM J. VALENTINE.

Witnesses:
  GEO. N. LANE,
  ROBERT MURRAY.